US007013678B2

(12) United States Patent
DiGiovanni et al.

(10) Patent No.: US 7,013,678 B2
(45) Date of Patent: Mar. 21, 2006

(54) METHOD OF FABRICATING GRADED-INDEX OPTICAL FIBER LENSES

(75) Inventors: David J. DiGiovanni, Montclair, NJ (US); William A. Reed, Summit, NJ (US); Andrew D. Yablon, Livingston, NJ (US); Man F. Yan, Berkeley Heights, NJ (US)

(73) Assignee: Fitel USA Corp, Norcross, GA (US)

( * ) Notice: Subject to any disclaimer, the term of this patent is extended or adjusted under 35 U.S.C. 154(b) by 209 days.

(21) Appl. No.: 10/247,101

(22) Filed: Sep. 19, 2002

(65) Prior Publication Data

US 2004/0055340 A1     Mar. 25, 2004

(51) Int. Cl.
    *C03B 37/018*     (2006.01)
(52) U.S. Cl. ............................ 65/435; 65/415; 65/417; 65/421; 65/433
(58) Field of Classification Search ................. 65/415, 65/429, 433, 435, 440, 417, 421, 413
    See application file for complete search history.

(56) References Cited

U.S. PATENT DOCUMENTS

| 4,246,016 | A | * | 1/1981 | Siegmund ..................... 65/400 |
| 4,680,046 | A | * | 7/1987 | Matsuo et al. ................. 65/395 |
| 6,131,414 | A | * | 10/2000 | Shimizu et al. ............... 65/378 |
| 6,705,126 | B1 | * | 3/2004 | Paek et al. ..................... 65/395 |
| 2002/0146202 | A1 | * | 10/2002 | Reed et al. ..................... 385/34 |
| 2003/0118305 | A1 | * | 6/2003 | Reed et al. ................. 385/124 |

FOREIGN PATENT DOCUMENTS

| JP | 04006121 A | * | 1/1992 |
| JP | 07333407 A | * | 12/1995 |
| JP | 2002293563 A | * | 10/2002 |

OTHER PUBLICATIONS

Gomez-Reino et al, NumericalAperture for Graded-Index tapered Planar Waveguides with a Hyperbolic Secant Refractive Index Profile, Journal of Modern Optics, 1998, vol. 45, No. 9, 1785-1795.*

* cited by examiner

*Primary Examiner*—Steven P. Griffin
*Assistant Examiner*—Carlos Lopez
(74) *Attorney, Agent, or Firm*—Polster, Lieder, Woodruff & Lucchesi, L.C.

(57) ABSTRACT

A GRIN fiber lens is fabricated by the steps of providing a graded index glass preform, thinning the graded index preform to remove a sufficient thickness of the graded glass to establish a desired $\Delta n$, and drawing a graded index optical fiber from the thinned graded index preform. Thinning, in this context, refers to removal of graded index glass from the outside of the graded index preform so as to reduce its outer diameter. The thinning thus changes $\Delta n$ which is the refractive index difference between the center of the preform and its outer surface. The graded index preform can be provided by MCVD deposition followed by removal of the starting tube glass, by OVD deposition, by VAD, or by ion exchange fabrication. The thinned graded index preform is advantageously annealed before drawing in order to minimize ripple. And, in a variation of the process, an overcladding can be applied over the thinned graded preform before draw for further adjustment or control of the $\Delta n$.

15 Claims, 3 Drawing Sheets

METHOD OF FABRICATING GRADED-INDEX OPTICAL FIBER LENSES

FIELD OF THE INVENTION

The present invention relates to a method of making a graded index optical fiber lens and, in particular, to a method of fabricating such lens with increased control over the refractive index profile.

BACKGROUND OF THE INVENTION

Graded-index optical fiber lenses (GRIN fiber lenses) are important components in optical fiber communication systems. A GRIN fiber lens comprises, in essence, a short length of optical fiber having a refractive index which is graded to act as a lens. Grading in this context means that the index of refraction of the fiber varies as a function of the radial distance from the center of the fiber. Transmitted light tends to bend toward regions of greater refractive index, so the graded-index fiber acts as a lens.

GRIN fiber lenses are highly useful for collimating the output of an optical fiber and for changing the spot diameter of an output beam. Collimating the fiber output permits the output signal to travel long distances outside the fiber without excessive diffraction. Increasing the beam spot size reduces the power density of the emerging beam and thus reduces the deleterious effects of high power. Changing the spot size also facilitates coupling a fiber to another fiber or device of different spot size. GRIN fiber lenses are particularly advantageous for such applications because they can be drawn to the same diameter as a transmission fiber and be fused to the transmission fiber by a low loss junction. The structure and applications of GRIN fiber lenses are described in greater detail in U.S. Pat. No. 4,701,011 issued to Emkey et al. on Oct. 20, 1987. The '011 patent is incorporated herein by reference.

Unfortunately it is very difficult to fabricate GRIN fiber lenses having precisely defined lens characteristics. GRIN lenses are typically fabricated via the modified chemical vapor deposition (MCVD) process by first forming a graded tubular optical preform and then drawing fiber from the preform. The preforms are commercially made using thermal chemical vapor reactions to deposit mixed oxides as layers of glass soot (particles) on the inside surface of a glass starting tube. The proportions of the reactants are varied as the thickness increases within the tube to grade the refractive index. Upon completion of the deposition, the tube is collapsed into a solid rod preform, and fiber is drawn from the preform in the conventional manner. The drawn fiber has a refractive index profile similar to that of the preform.

A primary problem in the fabrication of GRIN lenses is the difficulty of controlling the refractive index profile of the GRIN lens fiber by controlling the index profile of the preform. The desired refractive index profile of the GRIN fiber lens depends upon the application and the required optical performance. But changing the fiber profile by changing the composition profile of deposited glass is particularly difficult. The deposition equipment must be tuned in a tedious, time-consuming and expensive process. Accordingly there is a need for an improved method for fabricating GRIN fiber lenses with increased control over the refractive index profile.

SUMMARY OF THE INVENTION

In accordance with the invention, a GRIN fiber lens is fabricated by the steps of providing a graded index glass preform, thinning the graded index preform to remove a sufficient thickness of the graded glass to establish a desired $\Delta n$, and drawing a graded index optical fiber from the thinned graded index preform. Thinning, in this context, refers to removal of graded index glass from the outside of the graded index preform so as to reduce its outer diameter. The thinning thus changes $\Delta n$ which is the refractive index difference between the center of the preform and its outer surface. The graded index preform can be provided by MCVD deposition followed by removal of the starting tube glass, by OVD deposition, by VAD, or by ion exchange fabrication. The thinned graded index preform is advantageously annealed before drawing in order to minimize ripple. And, in a variation of the process, an overcladding can be applied over the thinned graded preform before draw for further adjustment or control of the $\Delta n$.

BRIEF DESCRIPTION OF THE DRAWINGS

The nature, advantages and various additional features of the invention will appear more fully upon consideration of the illustrative embodiments now to be described in connection with the accompanying drawings. In the drawings.

It is to be understood that these drawings are for purposes of illustrating the concepts of the invention and, except for the graphs, are not to scale.

DETAILED DESCRIPTION

The overall process of making a GRIN fiber lens in accordance with the invention involves providing a graded index glass preform, removing a sufficient thickness of the graded glass to establish a desired $\Delta n$ and drawing GRIN lens fiber from the thinned preform.

Figure 1:
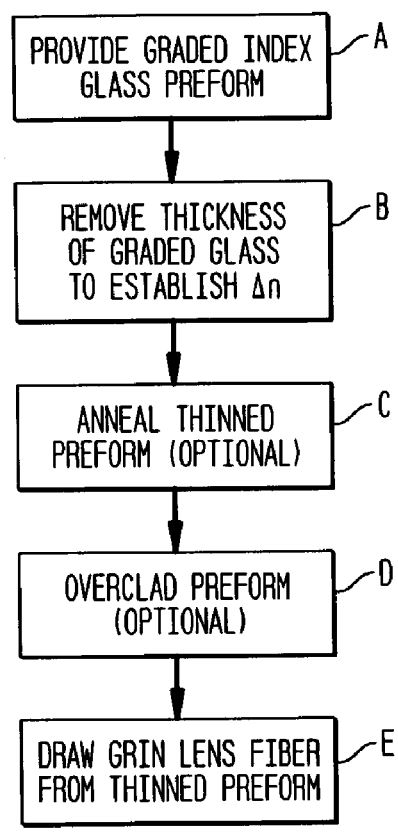
FIG. 1 is a block diagram of the steps in making a GRIN fiber lens.

Referring to the drawings, FIG. 1 is a schematic block diagram of an advantageous embodiment of this process. The first step, shown in Block A, is to provide a graded index glass preform. This is typically accomplished using the MCVD process wherein thermal chemical vapor reactions are used to deposit mixed oxides as layers of glass soot on the inside wall of a fused silica starting tube. At least one of the reactants is a dopant chosen to vary the refractive index of the deposited soot. Typically, the dopant increases the refractive index, and increasing amounts of the dopant are added as the deposited thickness increases. Since the deposition surface moves toward the radial center as the thickness increases, the refractive index increases toward the center.

After deposition, the starting tube and deposited glass soot are sintered, consolidated and collapsed into a solid rod preform. The solid rod preform will typically have a radially interior region of deposited glass with a graded refractive index profile and an exterior region of starting tube glass with a uniform refractive index. Collapse is typically effected by subjecting the tube to high temperature such as heat from a torch during which the surface tension causes a diameter reduction in the tube until it forms a solid rod. Further details concerning the MCVD process are set forth in MacChesney et al. U.S. Pat. Nos. 4,909,816; 4,334,903 and 4,217,027, each of which is incorporated herein by reference.

Figure 2:
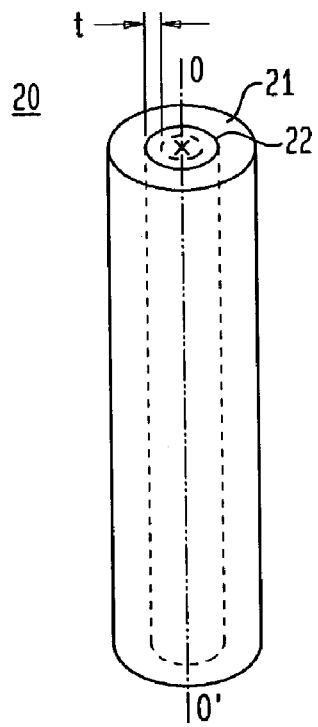
FIG. 2 illustrates a typical preform useful in the process of FIG. 1.

FIG. 2 schematically illustrates a collapsed solid rod preform 20 comprising a radially outer region 21 of starting tube glass and an interior region 22 of glass formed by consolidating the deposited soot. The outer region 21 typically has a uniform refractive index. The inner region 22 typically has a graded refractive index profile with the index typically dropping in value with increasing radial distance from the center line 0–0'.

Alternative ways of providing the graded index glass preform include the outside vapor deposition process (OVD), the vapor phase axial deposition process (VAD), and the ion exchange process. In the OVD process, the soot stream deposits on the outer surface of a mandrel and builds up radially to form a porous body. After the mandrel is removed, the body is inserted into a consolidation furnace where it is dried and sintered into a graded index glass preform.

In the VAD process, soot streams deposit on the end of a bait rod and build up axially to form a porous body similar to that produced by the OVD process. The bait rod, usually silica, is hung in a chamber and spun while plural torches spray soot on the end. The silica adheres to the end of the spinning bait rod as the rod is slowly lifted. A radial gradient in the index can be produced by providing different torches spraying with different amounts of dopant. Mixing of the soot as well as dopant diffusion in the glass creates a smoothly graded index profile. The resulting porous soot body is then consolidated into a graded index glass preform by heating in a furnace. Further details concerning the OVD and VAD processes may be found in *Fiber Fabrication*, Tingye Li, ed. (Academic Press, 1985).

In the ion exchange process, ions in the core region of the preform are exchanged with ions in a surrounding salt bath by diffusion through the bulk glass. This diffusion creates gradient in concentration of ions which causes a gradient in the refractive index. For example, ion-exchanging potassium in the core glass for thallium from a molten salt bath can produce a nearly parabolic refractive index profile. Further details concerning the ion exchange process may be found in Chapter 7 of Optical Fiber Telecommunications, edited by S. E. Miller and I. P. Kaminow, p.190, Academic Press, NY (1979).

The next step (Block B) is to remove a sufficient thickness of the graded glass to establish a desired Δn, where Δn is the refractive index difference between the center of the preform and the outer surface. For an MCVD preform, a preliminary step is to remove the glass of the starting tube 21.

Removal of the starting tube glass can be accomplished through chemical etching with hydrofluoric acid (HF). The etch rate in a 50% HF solution is on the order of 50–100 microns per hour. Thus, one hour of etching in an HF solution will reduce a starting tube clad preform diameter by about 100 to 200 microns. Alternatively, the starting tube glass can be removed by rotating the tube in the presence of a traversing plasma torch as described in U.S. Pat. No. 5,000,771 issued to J. W. Fleming on Mar. 19, 1991.

In accordance with the invention, a portion of the outer surface of the radially graded glass is removed to produce a thinned graded index preform. This step corresponds to removal of a thickness portion of region 22 of FIG. 2, e.g. removal of the portion designated t. The precise thickness removed controls the profile of the lens. The thickness of the radially graded region removed is typically in excess of 2.5 microns.

Etching away a portion of the preform containing an index gradient is used to change the "delta n" (Δn) of the preform. The Δn of a graded-index preform can be thought of as the refractive index difference between the center of the preform and its outer surface. This aspect of the invention is schematically illustrated in FIGS. 3A–3D below. The refractive index of an original GRIN preform (without a substrate tube), such as the one depicted in FIG. 3A, may be approximated as:

$$n(r) = n_{center} - \Delta n \frac{r^2}{R_{preform}^2} \qquad \text{(Eq. 1)}$$

where n(r) is the refractive index of the preform as a function of radial position r, $n_{center}$ is the refractive index at the center of the preform, and $R_{preform}$ is the preform radius. Δn is a measure of the refractive index difference between the center of the preform and its surface, and can be expressed as $\Delta n = n_{center} - n(R_{preform})$.

Figure 3:
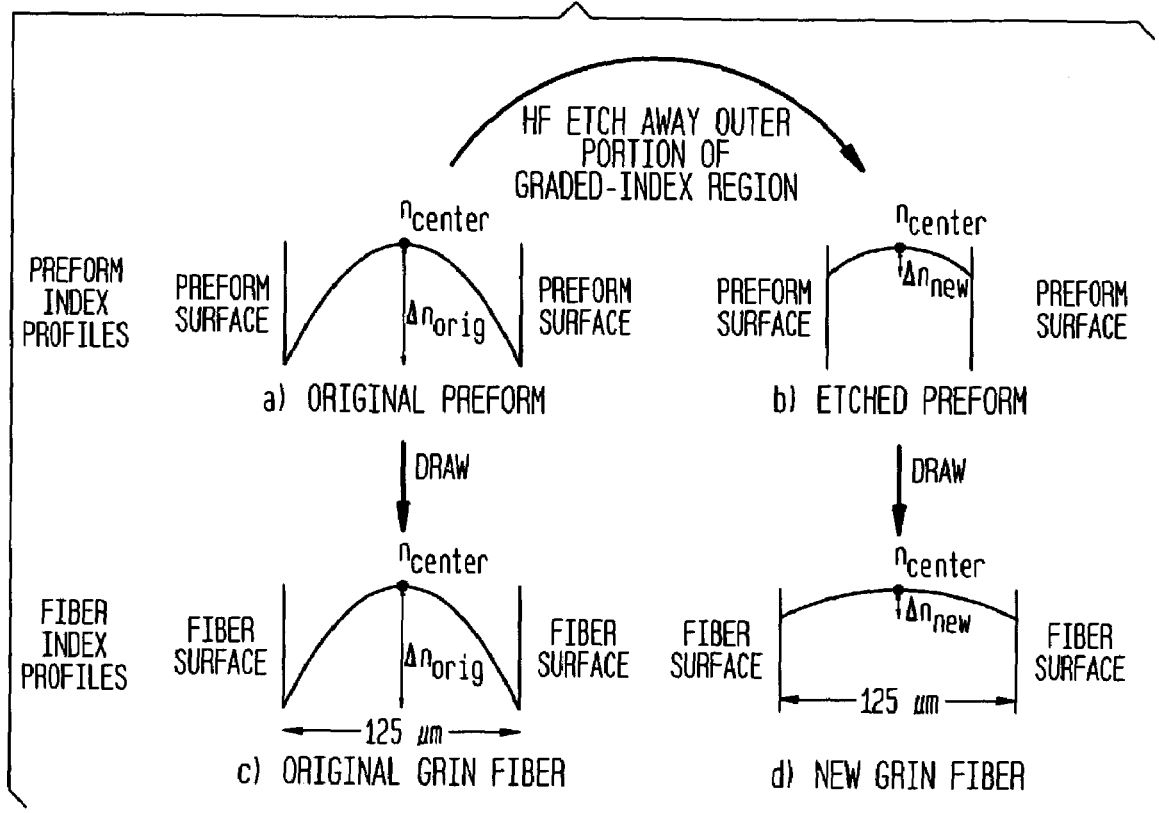
FIGS. 3A, 3B, 3C and 3D graphically illustrate control of the GRIN fiber refractive index profile by etching the preform.

FIGS. 3A and 3C illustrate the index profiles of a preform for which only the starting tube glass is removed and of a fiber drawn from that preform. As can be seen, the profile of the drawn fiber is similar to that of the preform except it is scaled over a shorter radial distance.

FIGS. 3B and 3D are corresponding respective profiles of a preform from which additional graded glass has been removed and a fiber drawn from the thinned preform. As can be seen, Δn has been reduced and the fiber drawn from the thinned preform has a flattened profile (FIG. 3D) as compared with the fiber drawn from the unthinned preform (FIG. 3C). In this way, removal of graded glass from the preform to control Δn controls the profile of the GRIN fiber lens drawn from the thinned preform.

When a portion of the graded-index region of the original preform is etched away to create a new preform such as the one depicted in FIG. 3B, the refractive index profile of the new preform will still obey Eq. 1 with the identical $n_{center}$, but with a different (smaller) Δn. The maximum Δn, is determined by the original (un-etched) preform. Any Δn smaller in magnitude than the original Δn, termed $\Delta n_{orig}$, may be fabricated from the original unetched preform by etching away the appropriate amount of graded-index material.

The removal of the graded thickness portion may advantageously be followed by an optional annealing of the thinned, radially graded preform (FIG. 1, Block C). Removing material from the outside of the graded-index preform tends to magnify imperfections such as ripples present in the original preform refractive index profile. Such ripple can be substantially reduced or suppressed by annealing the preform at high temperature (either before or after etching). The annealing accelerates diffusion of the dopants to smooth out any ripples or imperfections in the index profile. Advantageously, the preform can be stretched at high temperature before annealing to reduce the radial dimension of the preform. The preform is then annealed at high temperature.

The combination of reducing diameter and annealing significantly accelerates the rate at which dopant diffusion reduces ripples and imperfections.

A second optional step depicted in Block D is to overclad the thinned preform prior to drawing GRIN lens fiber. This optional step, which provides further control of the fiber index profile, will be discussed below.

The next step in forming a GRIN lens fiber is to draw fiber from the thinned radially graded preform as set forth in Block E. The technique of drawing an optical fiber from a preform is well-known.

Figure 4:
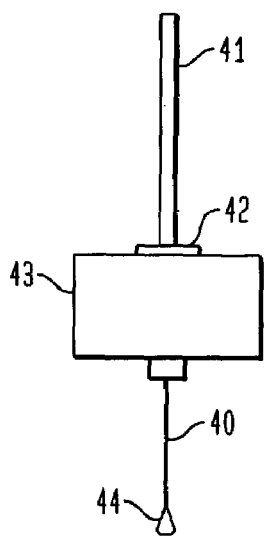
FIG. 4 illustrates drawing a GRIN fiber.

FIG. 4 illustrates drawing a GRIN lens fiber 40 from a thinned preform rod 41. The thinned preform 41 is typically inserted into the insulated susceptor 42 of a refractory furnace 43 where it is heated to a high drawing temperature. Upon sufficient heating, a melted end portion 44 bearing a fiber strand 40 drops, and the strand is inserted into a drawing station such as described in *Optical Fiber Telecommunications*, Ed. S. E. Miller and L. P. Kaminow, pp. 182–185 (Academic Press, 1988). The tension and draw rate are adjusted to draw a fiber of desired diameter.

The ideal fiber draw conditions will depend on the nature and concentration of dopants in the thinned preform. Nearly all practical optical fiber dopants reduce the viscosity of silica. Preforms that have a maximal amount of index-raising dopants in the center and a minimal amount of index-raising dopants on the outer surface will require a lower draw temperature, as more of the graded-index material is etched off the surface of the preform. The GRIN lens fiber is advantageously drawn to the same diameter as the fiber to which it is to be fused. Typically this is 125 micrometers. The lens fiber is typically cleaved to a length of less than 10 mm before or after fusing with other fiber or devices. The length of the GRIN lens, as well as its refractive index profile, controls the optical characteristics of the lens, so cleaving it to the correct length is important.

When the preform is drawn into a fiber, the refractive index profile remains substantially the same as the preform except the radial coordinate is scaled so that the fiber diameter is about 125 microns. Thus Eq. 1 can express the index profile of the fiber by substituting $R_{fiber}$ for $R_{preform}$. Etching away a portion of the graded-index region is thus an effective way to create many distinct GRIN fiber lens designs from a single original GRIN preform design.

In the optional step of Block D, the thinned graded index preform can be overclad prior to the draw for further control of the refractive index profile. Overcladding is typically accomplished by inserting the thinned graded index preform in an overcladding tube of typically uniform index glass. The overcladding tube is collapsed into the thinned preform prior to the draw.

The advantage of overcladding is that it permits further control over $\Delta n$. FIGS. 5A and 5C illustrate the index profiles of a thinned preform before and after overcladding. FIG. 5B shows the index profile of fiber drawn from the thinned preform without overcladding (FIG. 5A). FIG. 5D shows the index profile of fiber drawn from the overclad thinned preform (FIG. 5C). As can be seen from FIG. 5D $\Delta n$ measured as the index difference between the fiber center and its outer surface is increased for the overclad fiber. With overcladding, the index of the outer surface is precisely controlled by the overcladding tube.

Another advantage of overcladding is that it can provide a refractive index reduced from that of silica without using any dopant. This can be accomplished by use of an overcladding tube that is perforated with air holes. For example, if a silica overcladding tube is provided with a plurality of axially extending airholes and fiber is drawn from the overclad preform, then the refractive index near the surface is roughly proportional to the volume fraction of silica versus air. The airholes can be continuous along the preform axis or they can be formed along isolated regions. The size and spacing of the holes in the fiber should be comparable to or less than the optical wavelength to be transmitted in order to modify the effective refractive index. For typical applications, the size and spacing should be less than about 1.55 microns.

Figure 5:
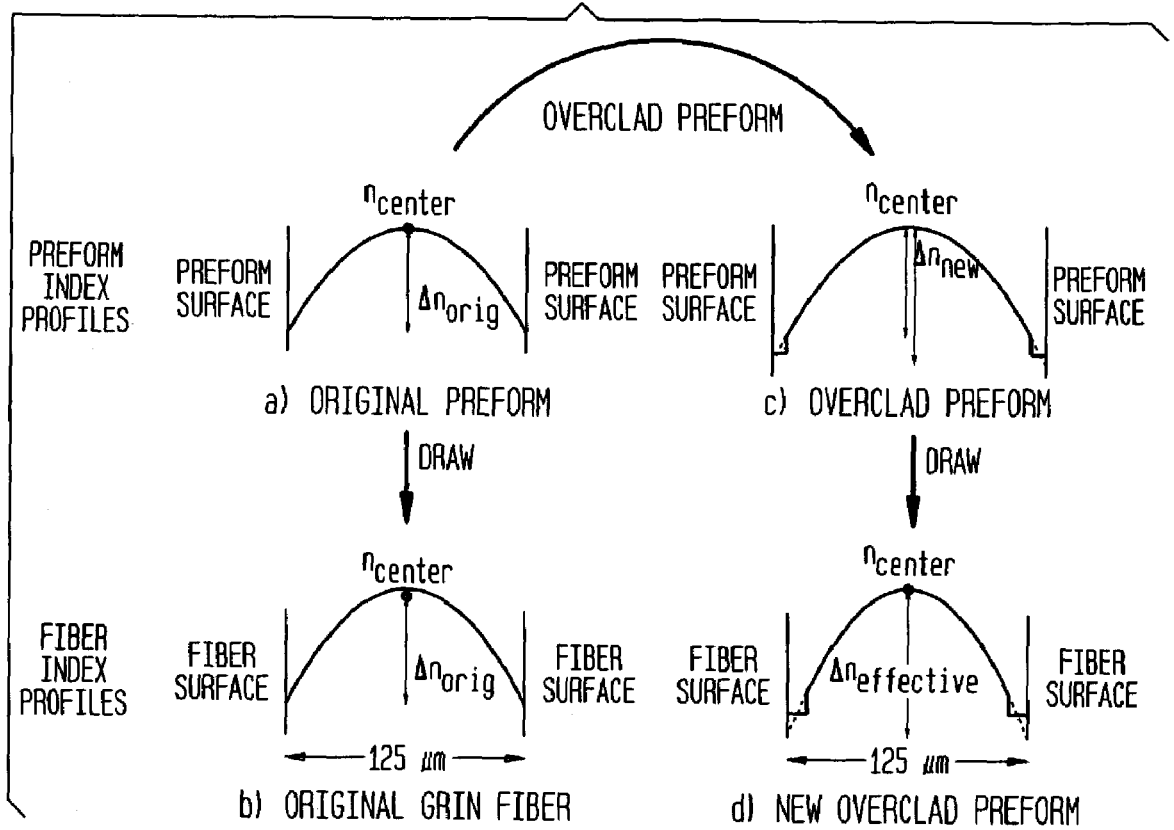
FIGS. 5A, 5B, 5C and 5D graphically illustrate control of the GRIN fiber refractive index profile by overcladding the preform.

As can be seen from FIG. 5, the refractive index of the overclad tube may not match the refractive index of the graded index glass. In such cases, a refractive index step will occur in the overclad preform. This step can be up or down depending on whether the refractive index of the overclad tube is higher or lower than the refractive index on the outside of the thinned preform.

Figure 6:
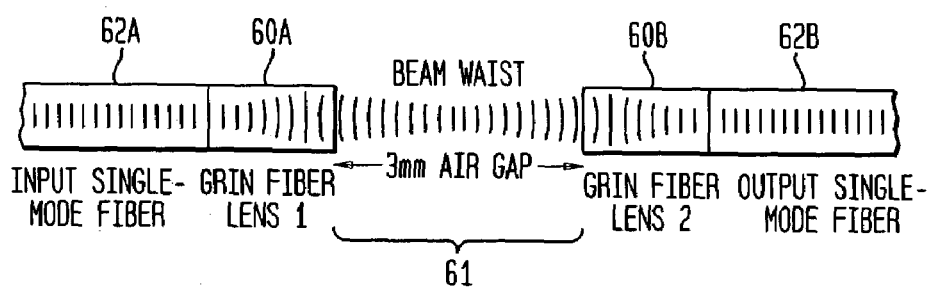
FIG. 6 illustrates use of GRIN fiber lenses to facilitate low loss coupling across an air gap.

FIG. 6 schematically illustrates an exemplary application of GRIN fiber lenses in accordance with the invention. Here a pair of GRIN fiber lenses 60A and 60B facilitate the transmission of light across an air gap 61 between two segments 62A and 62B of single mode optical transmission fiber. The tip of input transmission fiber 62A is fusion spliced to a short segment (<10 mm) of GRIN fiber forming lens 60A. The tip of output transmission fiber 62B is fusion spliced to similar short length of GRIN fiber to form lens 60B. The vertical lines schematically illustrate the size of the beam spot and the curvature of the phase fronts. The GRIN lenses 60A and 60B facilitate low loss coupling across the air gap.

The invention may now be more clearly understood by consideration of the following specific example:

EXAMPLE

To illustrate the present invention we describe a specific example in which a preform originally intended for high-bandwidth multimode telecommunication optical fiber was used instead as a precursor for fabricating a GRIN lens. This graded-index perform was fabricated by MCVD and was also overclad with an additional, constant refractive index, pure silica tube. The MCVD substrate tube was pure silica and also exhibited a constant refractive index. The graded-index region was fabricated using the well known MCVD process by depositing silica soot with increasing germania content so that when the perform was collapsed into a solid rod, the refractive index of the deposited glass varied inversely with the square of radial position. The maximum refractive index was in the center of the fiber and was 1.15% higher than that of the pure silica regions. The resulting refractive index (at 632.8 nm) of the preform's graded-index region was well approximated by the relation:

$$n(r) = 1.4748 - 0.017 \times \frac{r^2}{(8 \text{ mm})^2}$$

Thus the effective $\Delta n$ in the graded-index region was about 0.017. Once collapsed into a solid rod, the diameter of the graded-index region was about 15.4 mm while the preform outer diameter was about 40.0 mm.

The preform's entire overclad tube, entire substrate tube, and a portion of the graded-index region were etched away by a solution of 49% hydrofluoric acid and 51% water. The etch rate in the silica substrate tube and overclad tube region was constant at about 77 microns/hour while the etch rate in the graded-index region varied depending on the germania content of the exposed glass on the preform surface. Higher germania content resulted in a faster etch rate. For example, the etch rate when the preform surface exhibited a refractive index of 1.4593 was about 98 microns/hour while the etch rate when the preform surface exhibited a refractive index of 1.4623 was about 167 microns/hour. The variable etch rate required careful attention to the preform etch process to ensure the correct amount of material was removed.

The preform was etched until it was about 12 mm in diameter and the refractive index on the preform's outer surface was about 1.465 which is about 0.007 higher than pure silica. Upon completion of the etch process, the refractive index of the perform could be approximated by the relation:

$$n(r) = 1.4748 - 0.0098 \times \frac{r^2}{(6 \text{ mm})^2}$$

When compared with the first relation, we see that the etching process reduced the $\Delta n$ of the preform from its original value of 0.017 to a new value of 0.0098.

The preform was drawn into a 125 micron diameter GRIN fiber using a conventional zirconia draw furnace. Since the perform did not have a pure silica cladding, and since it had a high germania content throughout its entire cross-sectional area, the draw temperature and draw tension were both much lower than that of a conventional silica fiber (1750C versus 1950C and <25 g versus 100 g respectively). The resulting GRIN fiber refractive index profile corresponds to the etched preform refractive index profile with all radial dimensions reduced by a factor of about 96.

The 125 micron GRIN fiber was fusion spliced onto the end of a conventional piece of standard single-mode fiber (SMF) using a commercial fusion splicer. The fusion splice temperature was set lower than the temperature appropriate for fusion splicing standard single-mode silica fibers and the heat source was axially offset 50 microns away from the GRIN fiber because the high germania content of the GRIN fiber substantially reduced its viscosity. Once fusion spliced to SMF, the GRIN fiber was cleaved using a commercial fiber cleaver such that about 920 microns of GRIN fiber remained attached to the SMF fiber, thus forming a fiber GRIN lens. When two SMF fibers, each terminated with such GRIN fiber lenses, were separated by a 2 mm air gap, and were pointed directly at each other, they could transmit a 1530 nm optical signal across the air gap with only about 0.5 dB of loss (89% transmission). The corresponding optical loss across a 2 mm air gap for SMF fiber tips without the GRIN fiber lenses was about 25 dB (0.3% transmission). Thus, the exemplary GRIN fiber lenses efficiently couple optical signals across a relatively long air gap.

Only a small amount of preform material was consumed when drawing the GRIN fiber since only short lengths of fiber are required to fabricate GRIN fiber lenses. In accordance with the present invention, the remaining portion of the etched perform could be etched further to yield a GRIN fiber with different optical characteristics which might be more appropriate for other applications, such as beam collimation, beam expansion, or beam contraction. In general, further etching would further reduce the $\Delta n$ of the preform and corresponding GRIN fiber, thus reducing the refractive power of a corresponding GRIN fiber lens.

It is understood that the above-described embodiments is illustrative of only a few of the many possible specific embodiments, which can represent applications of the invention. Numerous and varied other arrangements can be made by those skilled in the art without departing from the spirit and scope of the invention.

We claim:

1. A method of making a graded index optical fiber lens with increased control over the refractive index profile comprising the steps of:
    providing a graded index glass preform;
    removing from the outer surface of the graded index glass preform a thickness of the graded glass to produce a thinned graded glass preform, the thickness of the graded glass removed sufficient to establish a desired $\Delta n$ for the thinned graded glass preform, where $\Delta n$ is the refractive index difference between the center of the preform and the outer surface; and
    drawing a graded index optical fiber from the thinned graded glass preform.

2. The method of claim 1 wherein the graded index glass preform is provided by MCVD deposition.

3. The method of claim 1 wherein the graded index glass preform is provided by OVD deposition.

4. The method of claim 1 wherein the graded index glass preform is provided by VAD deposition.

5. The method of claim 1 wherein the graded index glass preform is provided by an ion-exchanging process.

6. The method of claim 1 wherein the graded index glass preform is provided by vapor deposition of graded glass within a glass starting tube and the starting tube glass is removed before removal of the thickness of the graded glass.

7. The method of claim 1 wherein the thickness of the graded glass removed is at least 2.5 micrometers.

8. A method of making a graded index optical fiber lens with increased control over the refractive index profile comprising the steps of:
    providing a graded index glass preform;
    removing from the outer surface of the graded index glass preform a thickness of the graded glass to produce a thinned preform, the thickness of the graded glass removed sufficient to establish a desired $\Delta n$ for the thinned graded glass preform, where $\Delta n$ is the refractive index difference between the center of the preform and the outer surface;
    overcladding the thinned graded glass preform to produce an overclad graded glass preform; and
    drawing the graded index optical fiber from the overclad graded glass preform.

9. The method of claim 8 wherein the overcladding has a refractive index lower than the index at the surface of the thinned preform.

10. The method of clam 8 wherein the overcladding region contains perforated air holes.

11. The method of claim 10 where the perforated air holes are continuous dimension of the preform.

12. The method of claim 10 wherein the perforated air holes are isolated axial regions along the axial dimension of the preform.

13. The method of claim 8 wherein the overcladding has a refractive index higher than the index at the surface of the thinned preform.

14. A method of making a graded index optical fiber lens with increased control over the refractive index profile comprising the steps of:
    providing a graded index glass preform;

removing from the outer surface of the graded index glass preform a thickness of the graded glass to produce a thinned preform, the thickness of the graded glass removed sufficient to establish a desired Δn for the thinned glass preform, where Δn is the refractive index difference between the center of the preform and the outer surface;

annealing the thinned preform; and drawing the graded index optical fiber from the annealed thinned preform.

15. The method of claim 14 further comprising the step of stretching the thinned preform prior to annealing.

* * * * *